July 14, 1925.  
C. A. BLUHM  
1,546,164  
SHOCK ABSORBER FOR VEHICLES  
Filed May 13, 1924  2 Sheets-Sheet 1
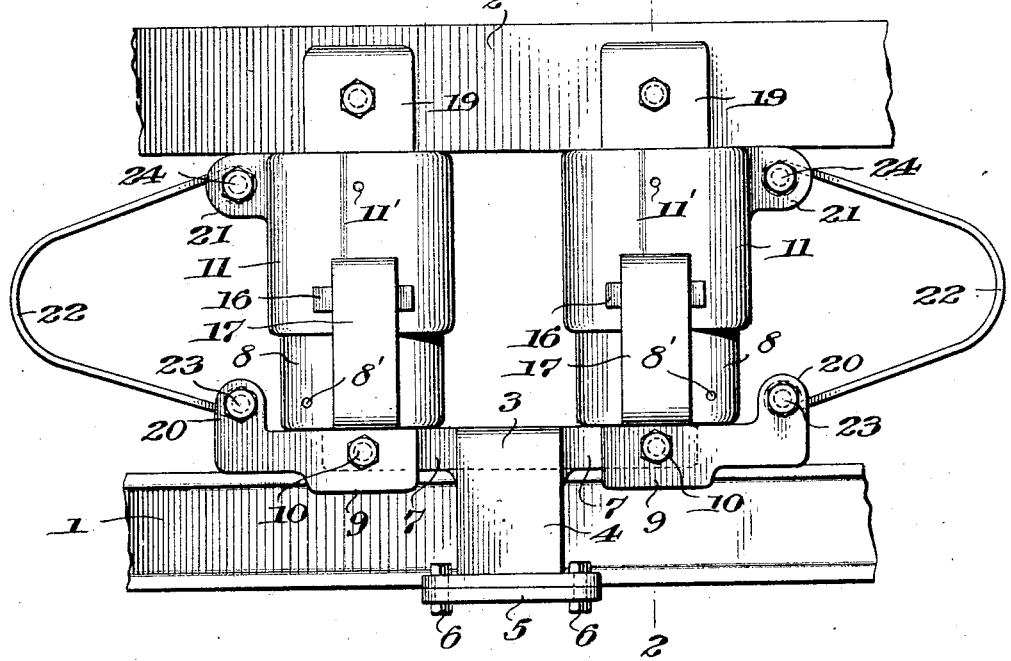
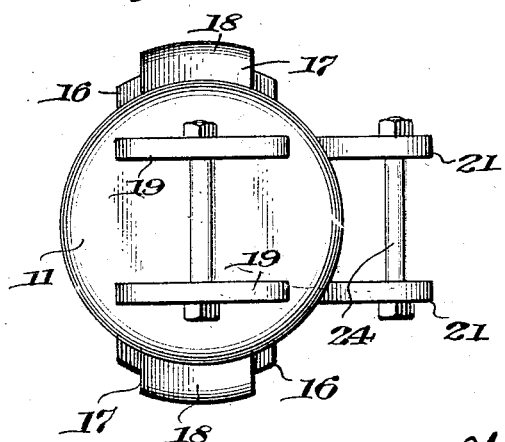
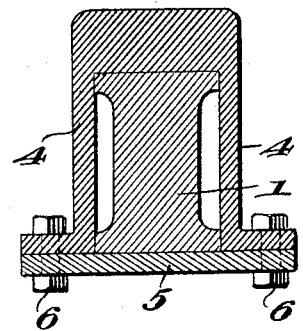
Inventor;  
Charles A. Bluhm  
Vernon E. Hodges  
By his Atty.

July 14, 1925.
1,546,164
C. A. BLUHM
SHOCK ABSORBER FOR VEHICLES
Filed May 13, 1924   2 Sheets-Sheet 2
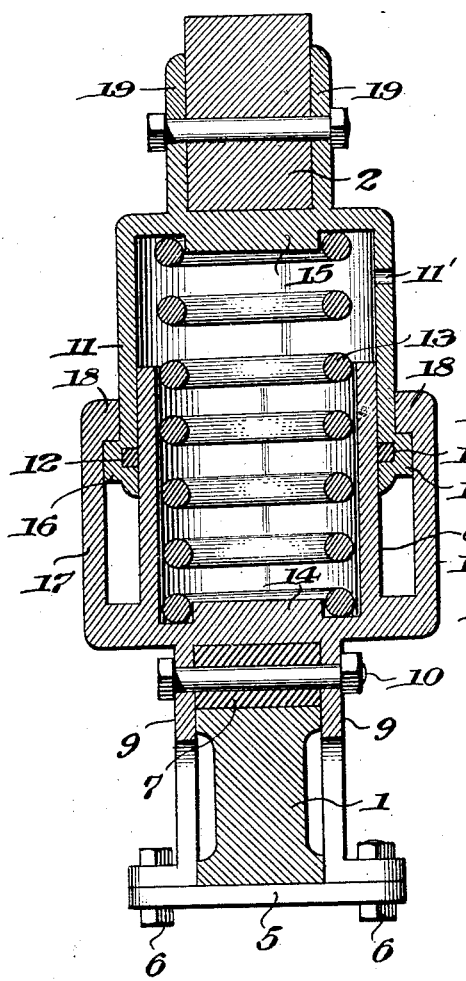
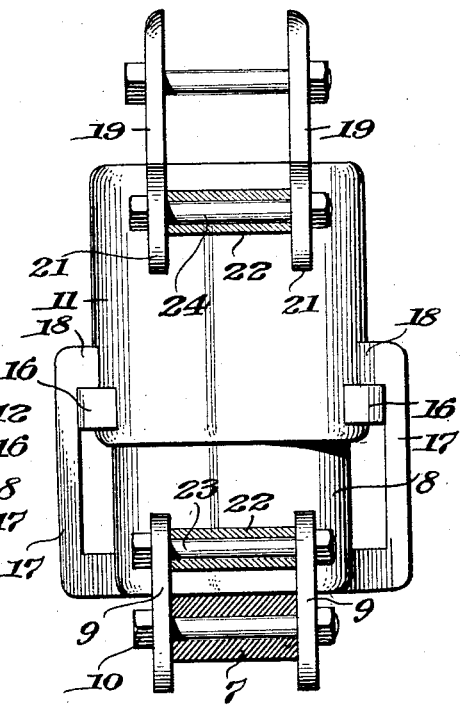

Patented July 14, 1925.  1,546,164

UNITED STATES PATENT OFFICE.

CHARLES A. BLUHM, OF MICHIGAN CITY, INDIANA.

SHOCK ABSORBER FOR VEHICLES.

Application filed May 13, 1924. Serial No. 713,034.

*To all whom it may concern:*

Be it known that I, CHARLES A. BLUHM, a citizen of the United States, residing at Michigan City, in the county of La Porte and State of Indiana, have invented certain new and useful Improvements in Shock Absorbers for Vehicles, of which the following is a specification.

This invention relates to shock absorbers for vehicles.

The object of the invention is to provide a shock-absorber of the class described, which, when placed between the axle and the chassis of the car will automatically absorb the shock imparted to the vehicle, the initial concussion being taken up by the coil springs and by compression of air within the cylinders, and the rebound being checked by the air-vents in the cylinders.

In the accompanying drawings:

Fig. 1 is a side elevation of the device;

Fig. 2 is a transverse section of the device taken on line 2—2 of Fig. 1;

Fig. 3 is an end view partly in section;

Fig. 4 is a top plan view of one of the units;

Fig. 5 is a transverse section through the axle and the supporting saddle.

The numeral 1 indicates the axle of the vehicle; and 2, the vehicle frame or chassis. Secured to the axle is a saddle 3, which has depending side members 4, 4, which surround the axle, the lower ends thereof being secured together to a bottom-plate 5, by suitable bolts 6, 6. Extending laterally of the saddle 3 are extensions 7, 7, which lie parallel and above the axle. Secured at the outer ends of each of the extensions 7, 7, are cup-like cylinders 8, 8, open at their upper ends, and provided at the bottom with suitable flange members 9, 9, which straddle the outer ends of the extensions 7, 7, and are secured thereto by means of transverse bolts 10, 10. Received upon each of the cylinders 8 is an inverted cup-like cylinder 11, of such a diameter as to receive the cylinder 8, each of said cylinders 11 being provided at the lower end with suitable packing-rings 12. Arranged within each of these telescoping cylinders 8 and 11 is a coil-spring 13, being properly seated within the cylinders by suitable projections 14 and 15 which project from the bases of the respective cylinders 8 and 11.

As a means for limiting the upward and downward movement of the cylinders 8 and 11, I preferably provide upon the lower end of the upper cylinder a lug 16. Extending upwardly from the lower end of the cylinder 8 are diametrically-arranged suitable straps 17, 17, the upper ends of which are turned inwardly as at 18, forming an abutment for the lug 16, this arrangement limiting the upward and downward movement of the telescopic cylinders 8 and 11. Each of the cylinders 8 and 11 is provided with suitable air-vents 8', 11', which serve to limit the outlet and intake of the telescopic cylinders and cushion the impact between the axle and the vehicle.

The upper ends of the cylinders 11 are provided with suitable flanges 19, 19, by which the upper cylinders 11 are secured to the frame or chassis 2 of the vehicle. Extending laterally from the lower end of the lower cylinder 8 are spaced lugs 20, and extending laterally from the upper end of the cylinder 11 and aligned with the lower lugs 20, 20, are similarly spaced lugs 21, 21. Interposed between the upper and lower lugs are flat looped springs 22, the inner ends thereof being secured between the lower lugs 20, 20, and the upper lugs 21, 21, being secured in place by transverse bolts 23 and 24, said springs acting to equalize (in connection with the coil-springs 13 and the telescopic cylinders) the amount of contraction and expansion of the telescopic cylinders as well as assisting to support and brace the telescopic cylinders endwise.

In assembling the telescopic cylinders, the lower cylinders are first secured to the saddle 3, after which the coil-springs 13 are placed within the cylinders, the latter then being slightly compressed and turned for alignment in the strap 17 and the lug 16, this movement bringing the lugs 17, 17, in proper alignment with the vehicle frame or chassis 2 to which it is secured.

I claim:

1. A shock-absorber comprising telescopic cylinders, and a spiral spring interposed between and within said cylinders, each of the cylinders having an open air-vent adjacent the outer end thereof for allowing air to be drawn into and compressed by the cylinders.

2. A shock-absorber comprising upper and lower telescopic cylinders, a spring interposed between the upper and lower cylinders, a saddle adapted to be secured to the frame of a vehicle, said saddle having lateral extensions to which the lower cylinders are secured, and means for securing the upper cylinders to the frame of the vehicle.

3. A shock-absorber comprising upper and lower telescopic cylinders, shock-absorbing means within said cylinders, and an external spring having its ends secured to the upper and lower cylinders.

4. A shock-absorber comprising upper and lower telescopic cylinders, shock absorbing means within said cylinders, laterally extending lugs arranged at the outer ends of the cylinders, and a looped spring having its ends secured to the laterally extending lugs.

5. A shock-absorber comprising a base provided with lateral extensions on either side, cup-shaped cylinders secured to said base, inverted cylinders telescoping the first-mentioned cylinders, said cylinders being closed at their opposite ends, a spiral spring arranged within said cylinders, lugs projecting upwardly from the upper cylinders for securing them in place, laterally-extending lugs arranged at the outer ends of said cylinders, and flat looped springs having their free ends secured to said laterally-extending lugs, and means for limiting the movement of the cylinders.

6. A shock-absorber comprising a base provided with lateral extensions on either side, cup-shaped cylinders secured to said base, inverted cylinders telescoping the first-mentioned cylinders, said cylinders being closed at their opposite ends, a spiral spring arranged within said cylinders, lugs projecting upwardly from the upper cylinders for securing them in place, laterally-extending lugs arranged at the outer ends of said cylinders, flat looped springs having their free ends secured to said laterally-extending lugs, and means for limiting the movement of the cylinders, including lugs projecting outwardly from the lower end of the upper cylinders, straps projecting upwardly from the base of the lower cylinders, the upper ends thereof in the path of travel of the lugs carried by the upper cylinders for limiting the movement thereof.

In testimony whereof I affix my signature.

CHARLES A. BLUHM.